US012010521B2

United States Patent
Shibata et al.

(10) Patent No.: US 12,010,521 B2
(45) Date of Patent: Jun. 11, 2024

(54) SIGNAL TRANSFER SYSTEM, SIGNAL TRANSFER METHOD, AND PATH CONTROL DEVICE

(71) Applicant: NIPPON TELEGRAPH AND TELEPHONE CORPORATION, Tokyo (JP)

(72) Inventors: Naotaka Shibata, Musashino (JP); Keita Takahashi, Musashino (JP); Tatsuya Fukui, Musashino (JP); Hideaki Kimura, Musashino (JP); Hirofumi Yamamoto, Musashino (JP); Noriyuki Ota, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 428 days.

(21) Appl. No.: 17/602,893

(22) PCT Filed: Mar. 26, 2020

(86) PCT No.: PCT/JP2020/013841
§ 371 (c)(1),
(2) Date: Oct. 11, 2021

(87) PCT Pub. No.: WO2020/209094
PCT Pub. Date: Oct. 15, 2020

(65) Prior Publication Data
US 2022/0201493 A1    Jun. 23, 2022

(30) Foreign Application Priority Data

Apr. 12, 2019 (JP) ................. 2019-076428

(51) Int. Cl.
*H04W 16/04* (2009.01)
*H04W 40/02* (2009.01)

(52) U.S. Cl.
CPC ........... *H04W 16/04* (2013.01); *H04W 40/02* (2013.01)

(58) Field of Classification Search
CPC ..... H04W 16/04; H04W 40/02; H04W 28/10; H04W 88/10; H04W 88/14; H04W 92/22; H04W 92/24
See application file for complete search history.

(56) References Cited

U.S. PATENT DOCUMENTS

2014/0233424 A1* 8/2014 Cvijetic ................ H04W 40/24
370/254
2020/0322084 A1* 10/2020 Zhang ..................... H04L 69/22
(Continued)

OTHER PUBLICATIONS

Radio wave allocation destination, automatic change in minutes 5G Ministry of Internal Affairs and Communications, Nihon Keizai Shimbun, Oct. 10, 2018, https://www.nikkei.com/article/DGXMZO36313720Q8A011C1MM8000.
(Continued)

*Primary Examiner* — Gary Mui
(74) *Attorney, Agent, or Firm* — Harness, Dickey & Pierce, P.L.C.

(57) ABSTRACT

Signal transfer devices that relay base stations of service providers that perform communication with radio terminals and an aggregation station that controls the base stations, and a route control device that controls signal distribution to user network interfaces (UNIs) and network network interfaces (NNIs) of each of the signal transfer devices, are included. The route control device includes an allocation information acquisition unit that acquires allocation information of frequency to each of the base stations; a band adjustment unit that adjusts an MBH band for each of the (Continued)

UNIs, on the basis of correspondence relation information representing a correspondence relation between the UNIs and the service providers, band information indicating a maximum MBH band of each of the UNIs, and the allocation information; and a distribution determination unit that determines signal distribution to each of the NNIs, on the basis of the MBH band adjusted by the band adjustment unit and configuration information representing a connection configuration of each of the signal transfer devices. The signal transfer device transmits a signal from each of the NNIs on the basis of the signal distribution to each of the NNIs determined by the distribution determination unit.

6 Claims, 11 Drawing Sheets

(56) References Cited

U.S. PATENT DOCUMENTS

2020/0328767 A1* 10/2020 Zhong ................. H04J 3/1658
2022/0200702 A1*  6/2022 Shibata ............. H04B 10/1129

OTHER PUBLICATIONS

Nippon Telegraph and Telephone West Corporation, LAN type communication network service interface <Business Ether Wide Edition> 1st edition, Literature, Feb. 27, 2019 (Reading Day), https://www.ntt-west.co.jp/info/katsuyo/pdf/07/tenpu06_4.pdf.

* cited by examiner

Fig. 3

|  | FIRST UNI | SECOND UNI | THIRD UNI | FOURTH UNI | FIFTH UNI | SIXTH UNI |
|---|---|---|---|---|---|---|
| BAND MAXIMUM VALUE (bps) | $g_{11}^{(B)}$ =10G | $g_{12}^{(B)}$ =10G | $g_{13}^{(B)}$ =10G | $g_{14}^{(B)}$ =10G | $g_{15}^{(B)}$ =10G | $g_{16}^{(B)}$ =10G |

| UNI | FIRST UNI | SECOND UNI | THIRD UNI | FOURTH UNI | FIFTH UNI | SIXTH UNI |
|---|---|---|---|---|---|---|
| REQUIRED BAND (bps) | $<g_{11}(B)$ $=10G$ | $<g_{12}(B)$ $=10G$ | $<g_{13}(B)$ $=10G$ | $<g_{14}(B)$ $=10G$ | $<g_{15}(B)$ $=10G$ | $<g_{16}(B)$ $=10G$ |
| NNI (10Gbps) | FIRST NNI | SECOND NNI | THIRD NNI | FOURTH NNI | FIFTH NNI | SIXTH NNI |

(b)

| SERVICE PROVIDER | A | | B | | C | |
|---|---|---|---|---|---|---|
| FREQUENCY ALLOCATION | B/4 | | B/4 | | B/2 | |
| UNI | FIRST UNI | SECOND UNI | THIRD UNI | FOURTH UNI | FIFTH UNI | SIXTH UNI |
| ADJUSTED BAND (bps) | $<g_{11}(B/4)$ $=2.5G$ | $<g_{12}(B/4)$ $=2.5G$ | $<g_{13}(B/4)$ $=2.5G$ | $<g_{14}(B/4)$ $=2.5G$ | $<g_{15}(B/2)$ $=5G$ | $<g_{16}(B/2)$ $=5G$ |
| NNI (10Gbps) | FIRST NNI | | | | SECOND NNI | |

(c)

| SERVICE PROVIDER | A | | B | | C | |
|---|---|---|---|---|---|---|
| FREQUENCY ALLOCATION | B/2 | | B/3 | | B/6 | |
| UNI | FIRST UNI | SECOND UNI | THIRD UNI | FOURTH UNI | FIFTH UNI | SIXTH UNI |
| ADJUSTED BAND (bps) | $<g_{11}(B/2)$ $=5G$ | $<g_{12}(B/2)$ $=5G$ | $<g_{13}(B/3)$ $=3.3G$ | $<g_{14}(B/3)$ $=3.3G$ | $<g_{15}(B/6)$ $=1.6G$ | $<g_{16}(B/6)$ $=1.6G$ |
| NNI (10Gbps) | FIRST NNI | | | | SECOND NNI | |

Fig. 5
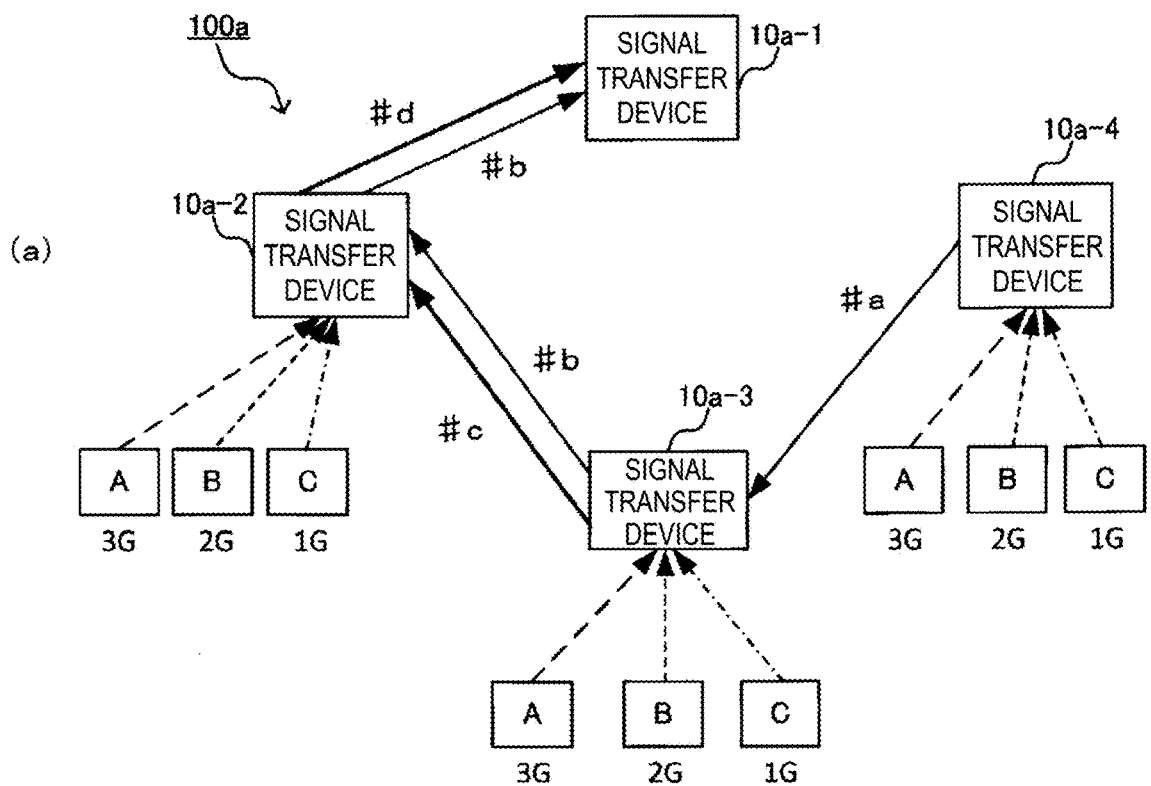
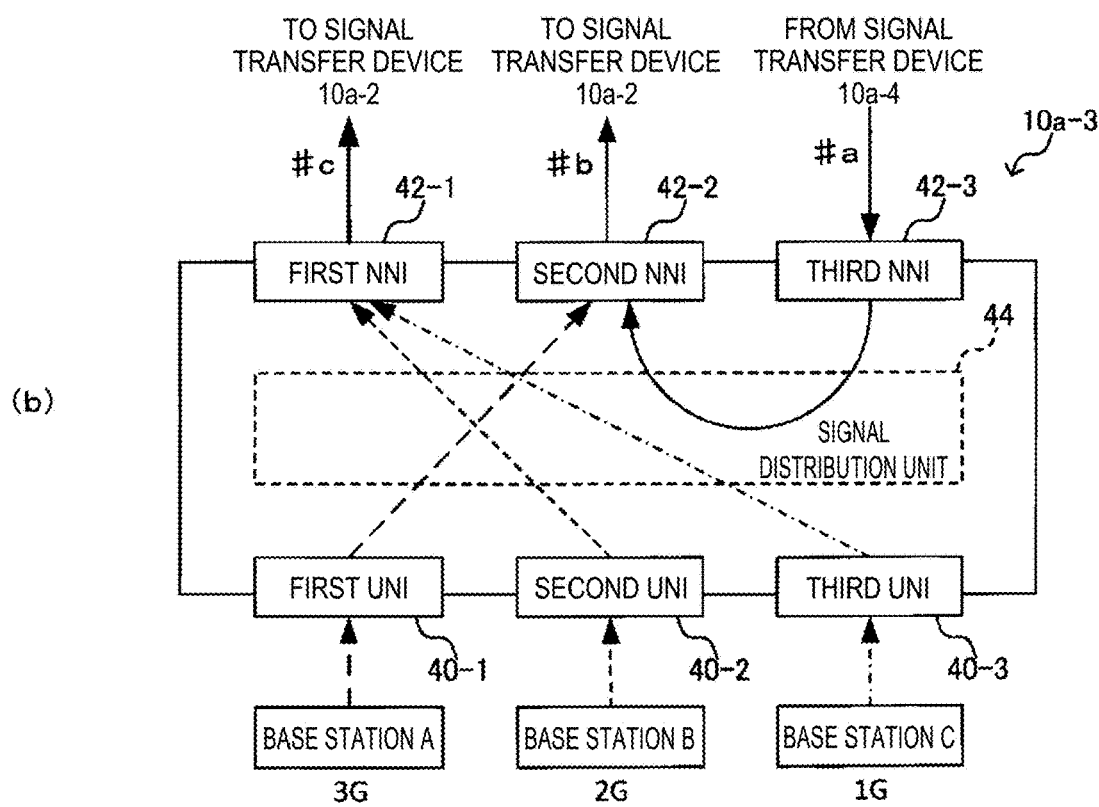

Fig. 6
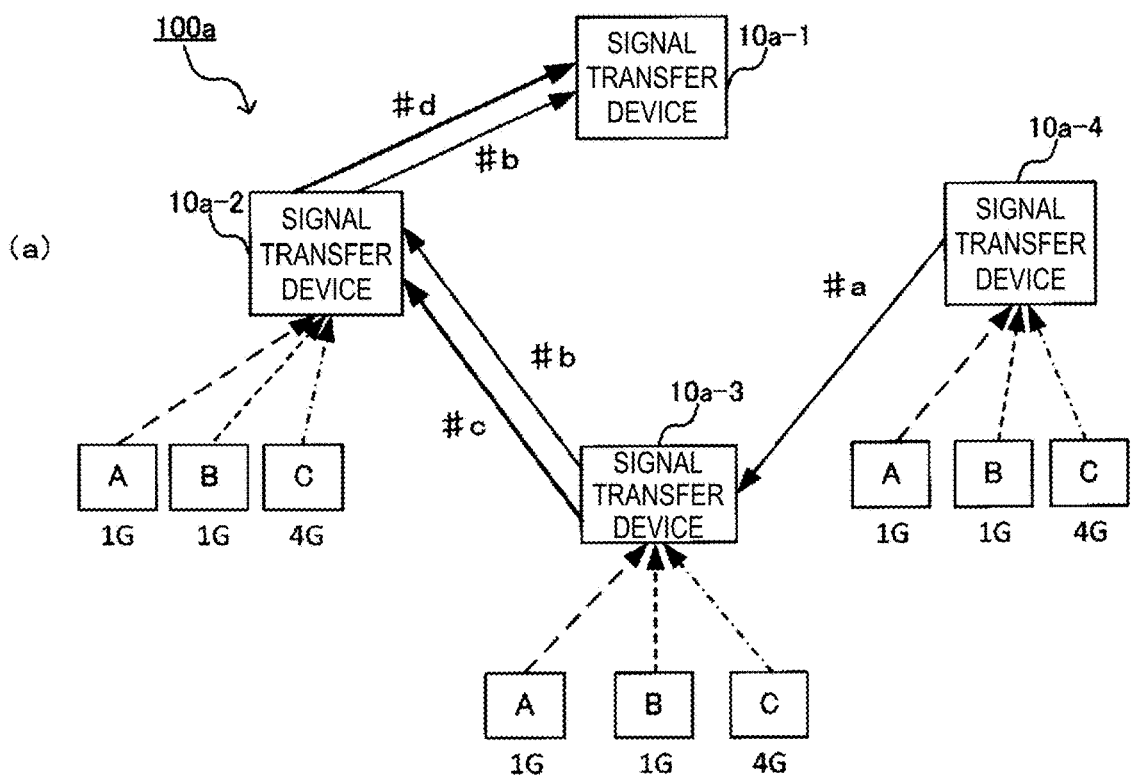
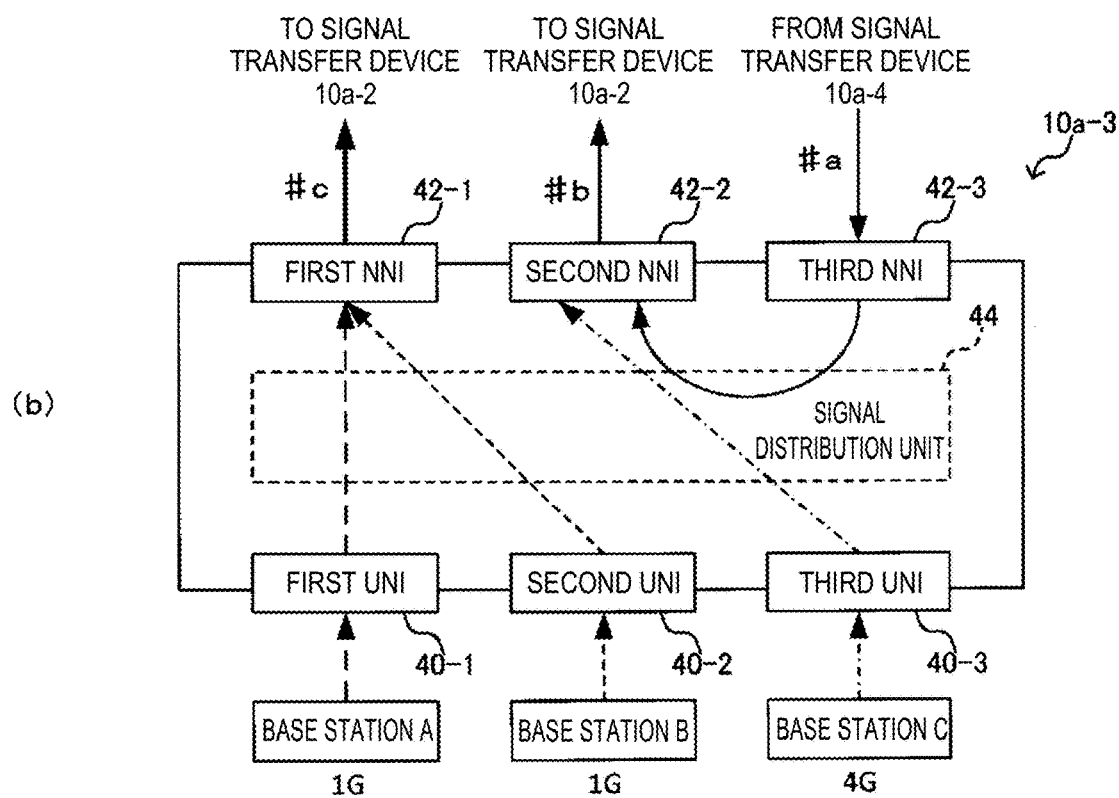

SIGNAL TRANSFER SYSTEM, SIGNAL
TRANSFER METHOD, AND PATH CONTROL
DEVICE

CROSS-REFERENCE TO RELATED
APPLICATIONS

This application is a 371 U.S. National Phase of International Application No. PCT/JP2020/013841 filed on Mar. 26, 2020, which claims priority to Japanese Application No. 2019-076428 filed on Apr. 12, 2019. The entire disclosures of the above applications are incorporated herein by reference.

TECHNICAL FIELD

The present invention relates to a signal transfer system, a signal transfer method, and a route control device.

BACKGROUND ART

In a cellular system widely provided throughout the country, base stations are developed throughout the country and an aggregation station is provided at the upper level thereof to control the base stations. Base stations and an aggregation station are connected with each other over the network constructed by a signal transfer device. Such a section is called Mobile Backhaul (MBH). The signal transfer device may be a layer 2 switch or a layer 3 switch (router).

There are a plurality of users who operate cellular systems (hereinafter referred to as service providers). If respective service providers construct MBH independently, signal transfer devices and optical cables between the signal transfer devices are required for the number of service providers. Base stations provided by the respective service providers are often installed at one shared building. Therefore, by constructing MBH of a plurality of service providers using a shared signal transfer device rather than preparing signal transfer devices corresponding to the number of service providers, it is possible to reduce the required number of signal transfer devices and optical cables and to realize efficient MBH construction.

Moreover, frequency resources suitable for radio communication is tight recently. On the other hand, not the entire frequency bandwidth allocated for radio communication are used constantly. The used state is biased depending on the place, time, and service providers. Therefore, it is considered to share a frequency resource by a plurality of service providers and dynamically change the allocation of a frequency bandwidth to each service provider according to the used state. That is, by allocating a larger frequency bandwidth to a service provider having larger traffic and allocating a smaller frequency bandwidth to a service provider having small traffic, one frequency resource can be used effectively.

In the case of a system widely developed throughout the country such as a cellular system, it is considered that a plurality of service providers develop services at the same time and the same location and use the frequency resource. However, to use the same frequency band by a plurality of service providers, a large number of antennas are required for space separation, which is difficult to be realized.

Therefore, it is considered that a plurality of service providers develop services at the same time and the same location using different frequency bands. For example, $x_{j1} + x_{j2} + \ldots + x_{jn} = B$ ($0 \leq x_{ji} \leq B$, $1 \leq j \leq t$, $1 \leq i \leq n$) is established, where n represents the number of service providers, t represents the number of signal transfer devices, B represents the entire bandwidth, $x_{ji}$ ($1 \leq j \leq t$, $1 \leq i \leq n$) represents a frequency bandwidth allocated to each service provider under the control of a signal transfer device #j. On the other hand, since base stations accommodated in different signal transfer devices may develop services at different locations, $x_{1i}, x_{2i}, \ldots, x_{ti}$ can be set independently.

FIG. 9 is a diagram illustrating an exemplary configuration of a signal transfer system in which a plurality of signal transfer devices each accommodate base stations of a plurality of service providers at different locations. The signal transfer system illustrated in FIG. 9 includes, for example, four signal transfer devices 1-1 to 1-4, a route control device 2, and an allocation determination device 3. Hereinafter, in the case of not specifying one of a plurality of constituent elements such as the signal transfer devices 1-1 to 1-4, such a constituent element is simply described as a signal transfer device 1 or the like.

Each of the signal transfer devices 1-1 to 1-4 relays communication between base stations A, B, and C of a plurality of service providers that perform radio communication control on the basis of the defined frequency bandwidth, and aggregation stations A, B, and C of the plurality of service providers, which is performed for each service provider. Hereinafter, it is assumed that the base station A and the aggregation station A are a base station and an aggregation station of a service provider A. Similarly, the base station B and the aggregation station B, and the base station C and the aggregation station C are base stations and aggregation stations of service providers B and C, respectively.

Here, it is also assumed that each of the signal transfer devices 1-1 to 1-4 accommodates two base stations of each of the base stations A, B, and C (six base stations). This means that the signal transfer devices 1-1 to 1-4 are shared by the service providers A, B, and C.

The route control device 2 controls the route of the network between the signal transfer devices 1-1 to 1-4. The allocation determination device 3 determines the frequency bandwidth to be allocated to each of the service providers A, B, C, and notifies the service providers A, B, and C of it. Note that the network between the signal transfer devices 1-1 to 1-4 may have any configuration such as a ring type, a honeycomb type, a mesh type, or the like.

While the frequency bandwidth determined by the allocation determination device 3 is notified to either a base station or an aggregation station or both of them, in this example, it is only notified to a base station.

Communication from the allocation determination device 3 to each base station may be performed over a dedicated control network, or may be performed over the network between the signal transfer devices 1-1 to 1-4. Similarly, communication from the route control device 2 to the signal transfer devices 1-1 to 1-4 may be performed over a dedicated control network.

FIG. 10 illustrates an exemplary configuration of the signal transfer device 1. The signal transfer device 1 includes first to sixth user network interfaces (UNI) 4-1 to 4-6, a signal distribution unit 400, and first to sixth network network interfaces (NNI) 4a-1 to 4a-6.

The first to sixth UNIs 4-1 to 4-6 receive signals from base stations. The signal distribution unit 400 arbitrarily distribute signals received by the first to sixth UNIs 4-1 to 4-6 to the first to sixth NNIs 4a-1 to 4a-6, on the basis of distribution setting information input from the route control device 2. The first to sixth NNIs 4a-1 to 4a-6 perform communication with other signal transfer devices 1 in the network.

For example, output signals from the first to sixth NNIs 4a-1 to 4a-6 are handled in optical data units (ODU) in the transmission devices that transmit signals, and are multiplexed with another ODU in ODU units, and are transmitted in an arbitrary transmission wavelength and a transmission route. However, since the signal transfer system according to the present application does not depend on processing on the transmission device side, description of the transmission device side is omitted herein.

The signal transfer device 1 also performs setting by the signal distribution unit 400 on signals input from a different UNI if the required MBH band is narrow so as to allow them to pass through the same NNI. Thereby, the required number of NNIs can be reduced.

In the example illustrated in FIG. 10, a signal input from the third UNI 4-3 and a signal input from the fourth UNI 4-4 are multiplexed, and output via one NNI namely the third NNI 4a-3. Similarly, a signal input from the fifth UNI 4-5 and a signal input from the sixth UNI 4-6 are multiplexed, and output via one NNI namely the fifth NNI 4a-5. That is, in the signal transfer device 1, the number of required NNIs is reduced compared with the case where an NNI is allocated to each UNI individually.

FIG. 11 illustrates an exemplary configuration of the route control device 2. As illustrated in FIG. 11, the route control device 2 includes a band holding unit 2a, a configuration information holding unit 2b, and a distribution determination unit 2c.

The band holding unit 2a holds a maximum MBH band for each UNI, and outputs it to the distribution determination unit 2c. The configuration information holding unit 2b holds configuration information representing the connection configuration of the signal transfer devices 1-1 to 1-4, and outputs it to the distribution determination unit 2c. The distribution determination unit 2c determines signal distribution to each of the signal transfer devices 1-1 to 1-4, on the basis of the required MBH band for each UNI and the configuration information input from the band holding unit 2a and the configuration information holding unit 2b.

Here, the sum value of bands required between signal transfer devices 1 is $\Sigma(j=1:t, k=1:K) g_{jk}(x_{ji})$, where $g_{jk}(x_{ji})$ represents a required MBH band for the $k^{th}$ UNI under the control of a signal transfer device #j having K pieces of UNI ports. Here, i is determined depending on k.

Further, since the MBH band is wider as the allocated frequency bandwidth is wider, $g_{ji}(x_{ji})$ is a monotone increasing function. Note that $g_{ji}$ largely depends on the number of base stations installed by each service provider, the number of antennas per base station, and the frequency utilization efficiency.

CITATION LIST

Non-Patent Literature

Non-Patent Literature 1: Radio Allocation Destination, Automatically Changed in Minutes, Look to 5G, Ministry of Internal Affairs and Communications, [online], 2018 Oct. 10, Nihon Keizai Shinbun, [Searched 2019 Feb. 27], Internet <URL:https://www.nikkei.com/article/DGXMZO36313720Q8A011C 1MM8000/>

Non-Patent Literature 2: Interface for LAN Communication Network Service <Business Ether WIDE>, First Edition, [online], West Nippon Telegraph and Telephone Corporation, [Searched 2019 Feb. 27], Internet <URL:https://www.ntt-west.co.jp/info/katsuyo/pdf/07/tenpu06_4.pdf>

SUMMARY OF THE INVENTION

Technical Problem

The signal distribution unit 400 determines that a signal input from which UNI is to be multiplexed, on the basis of the MBH band for each UNI. Here, since the frequency bandwidth of each service provider varies, the MBH band required for each UNI also varies within a range of $0 \leq g_{jk}(x_{ji}) \leq g_{jk}(B)$. If the signal distribution unit 400 considers multiplexing according to the maximum required MBH band $g_{jk}(B)$ for each UNI, the MBH band is broadened, whereby the number of required NNI increases.

An object of the present invention is to provide a signal transfer system, a signal transfer method, and a route control device that enable signals from a plurality of base stations to be transferred efficiently.

Means for Solving the Problem

A signal transfer system according to one aspect of the present invention is a signal transfer system that includes a plurality of signal transfer devices that relay a plurality of base stations of a plurality of service providers that perform communication with radio terminals and an aggregation station that controls the plurality of base stations; and a route control device that controls signal distribution to a plurality of UNIs and a plurality of NNIs of each of the signal transfer devices. The route control device includes an allocation information acquisition unit that acquires allocation information of frequency to each of the base stations; a band adjustment unit that adjusts an MBH band for each of the UNIs, on the basis of correspondence relation information representing a correspondence relation between the UNIs and the service providers, band information indicating a maximum MBH band of each of the UNIs, and the allocation information; and a distribution determination unit that determines signal distribution to each of the NNIs, on the basis of the MBH band adjusted by the band adjustment unit and configuration information representing a connection configuration of each of the signal transfer devices. Each of the signal transfer devices transmits a signal from each of the NNIs on the basis of the signal distribution to each of the NNIs determined by the distribution determination unit.

According to one aspect of the present invention, the signal transfer system further includes a traffic collection unit that collects traffic information representing traffic of each of the plurality of base stations; and a change request unit that outputs allocation change request information representing an allocation change request of frequency to each of the base stations, on the basis of the traffic information. The allocation information acquisition unit acquires the allocation information changed on the basis of the allocation change request information.

A signal transfer method according to one aspect of the present invention is a method using a plurality of UNIs and a plurality of NNIs of each of a plurality of signal transfer devices that relay a plurality of base stations of a plurality of service providers that perform communication with radio terminals and an aggregation station that controls the plurality of base stations. The method includes an allocation information acquisition step of acquiring allocation information of frequency to each of the base stations; a band adjustment step of adjusting an MBH band for each of the UNIs, on the basis of correspondence relation information representing a correspondence relation between the UNIs and the service providers, band information representing a maximum MBH band of each of the UNIs, and the allocation information; and a distribution determination step of determining signal distribution to each of the NNIs, on the basis of the MBH band adjusted and configuration information representing a connection configuration of each of the signal transfer devices.

According to one aspect of the present invention, the signal transfer method further includes a traffic collection step of collecting traffic information representing traffic of each of the plurality of base stations; and a change request step of outputting allocation change request information representing an allocation change request of frequency to each of the plurality of base stations, on the basis of the traffic information. The allocation information acquisition step includes acquiring the allocation information changed on the basis of the allocation change request information.

A route control device according to one aspect of the present invention is a route control device that controls signal distribution to a plurality of UNIs and a plurality of NNIs of each of a plurality of signal transfer devices that relay a plurality of base stations of a plurality of service providers that perform communication with radio terminals and an aggregation station that controls the plurality of base stations. The route control device includes an allocation information acquisition unit that acquires allocation information of frequency to each of the plurality of the base stations; a band adjustment unit that adjusts an MBH band for each of the UNIs, on the basis of correspondence relation information representing a correspondence relation between the UNIs and the service providers, band information indicating a maximum MBH band of each of the UNIs, and the allocation information; and a distribution determination unit that determines signal distribution to each of the NNIs, on the basis of the MBH band adjusted by the band adjustment unit and configuration information representing a connection configuration of each of the signal transfer devices.

According to one aspect of the present invention, the route control device further includes a traffic collection unit that collects traffic information representing traffic of each of the plurality of base stations; and a change request unit that outputs allocation change request information representing an allocation change request of frequency to each of the plurality of base stations, on the basis of the traffic information. The allocation information acquisition unit acquires the allocation information changed on the basis of the allocation change request information.

Effects of the Invention

According to the present invention, signals from a plurality of base stations can be transferred efficiently.

BRIEF DESCRIPTION OF DRAWINGS

FIG. 3 illustrates a specific example of band information held by a band holding unit.

FIG. 4(a) illustrates signal distribution from UNIs to NNIs in the case where band adjustment is not performed.

FIG. 4(b) illustrates signal distribution from UNIs to NNIs in the case where a route control device performs band adjustment. FIG. 4(c) illustrates signal distribution from UNIs to NNIs in the case where a route control device performs band adjustment when allocation of frequency band is changed after the band adjustment illustrated in FIG. 4(b).

FIG. 5(a) illustrates exemplary routes of transferring signals in a first modification of a signal transfer system. FIG. 5(b) illustrates exemplary operations of signal transfer devices.

FIG. 6(a) illustrates exemplary routes of transferring signals in the first modification of a signal transfer system. FIG. 6(b) illustrates exemplary operations of signal transfer devices.

DESCRIPTION OF EMBODIMENTS

Figure 1:
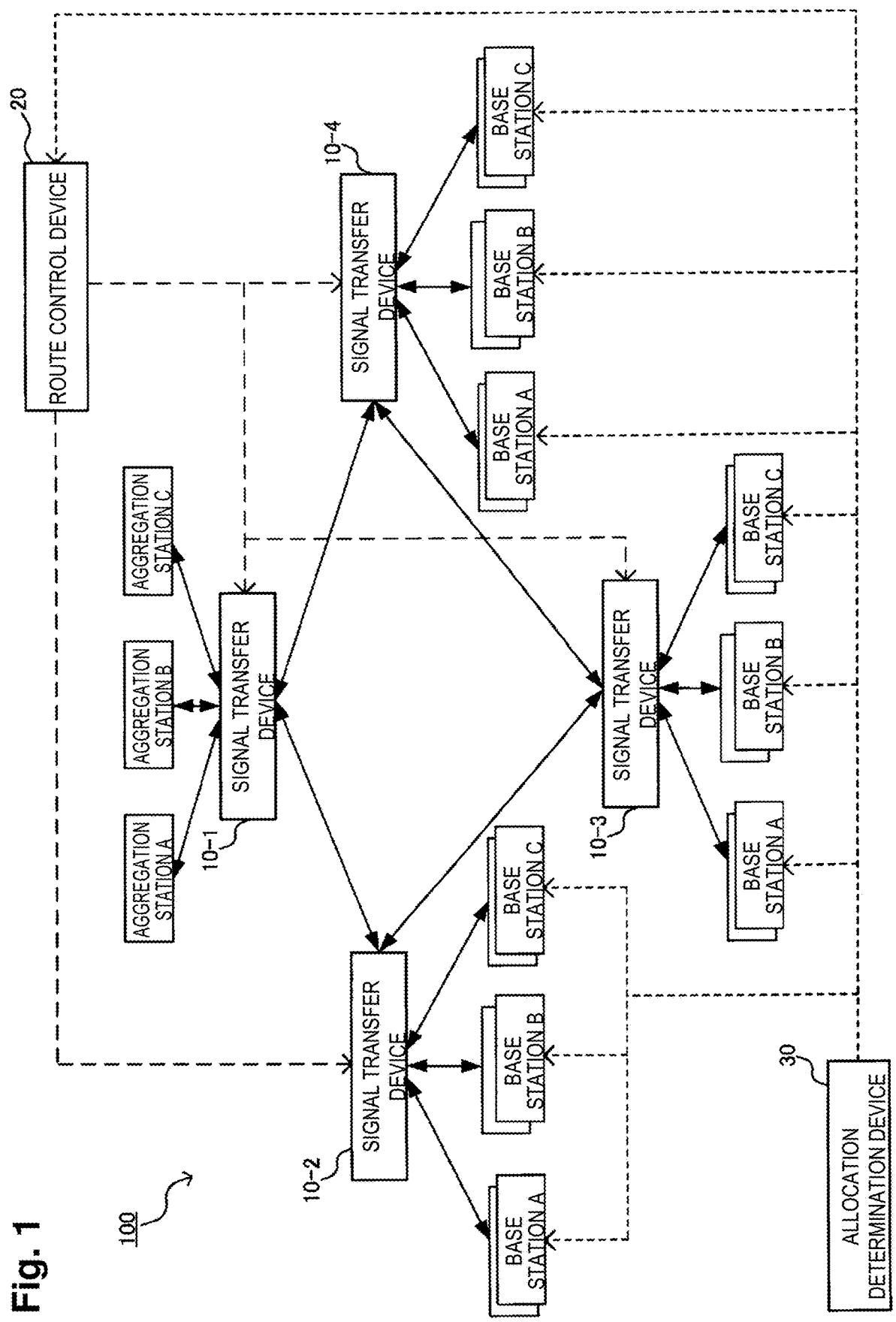
FIG. 1 is a diagram illustrating an exemplary configuration of a signal transfer system according to one embodiment.

Hereinafter, one embodiment of a signal transfer system will be described with use of the drawings. FIG. 1 is a diagram illustrating an exemplary configuration of a signal transfer system 100 according to one embodiment. As illustrated in FIG. 1, the signal transfer system 100 includes, for example, four signal transfer devices 10-1 to 10-4, a route control device 20, and an allocation determination device 30, and constitutes a cellular system in which radio terminals perform radio communication via base stations accommodated in, for example, each of the signal transfer devices 10-2 to 10-4.

The signal transfer devices 10-1 to 10-4 are connected with each other over the network. Note that the network between the signal transfer devices 10-1 to 10-4 may have any configuration such as a ring type, a honeycomb type, a mesh type, or the like.

Each of the signal transfer devices 10-1 to 10-4 relays communication between base stations A, B, and C of a plurality of service providers that perform radio communication control based on the defined frequency bandwidth, and aggregation stations A, B, and C that control the base stations of the service providers respectively, for each service provider under the control of the route control device 20. Even in this example, it is assumed that the base station A and the aggregation station A are a base station and an aggregation station of a service provider A. Similarly, the base station B and the aggregation station B, and the base station C and the aggregation station C are base stations and aggregation stations of service providers B and C, respectively.

It is also assumed that each of the signal transfer devices 10-1 to 10-4 accommodates two base stations of each of the base stations A, B, and C (six base stations). This means that the signal transfer devices 10-1 to 10-4 are shared by the service providers A, B, and C.

The route control device 20 controls routes of the network between the signal transfer devices 10-1 to 10-4, on the basis of frequency allocation information input from the allocation determination device 30. For example, the route control device 20 controls signal distribution to a plurality of UNIs and a plurality of NNIs of each of the signal transfer devices 10-1 to 10-4.

The allocation determination device 30 determines a frequency bandwidth to be allocated to each of the service providers A, B, and C, and notifies, for example, the base stations of the service providers A, B, and C and the route control device 20 of the determined frequency allocation information. Note that the allocation information output by the allocation determination device 30 may be acquired by snooping the signals transmitted to the base stations by the signal transfer devices 10 or the route control device 20.

Communication from the allocation determination device 30 to each base station and the route control device 20 may be performed over a dedicated control network, or may be performed over the network between the signal transfer devices 10-1 to 10-4. Similarly, communication from the route control device 20 to the signal transfer devices 10-1 to 10-4 may be performed over a dedicated control network. In the allocation determination device 30, a cycle of determining and changing the frequency allocation may be set arbitrarily.

Figure 2:
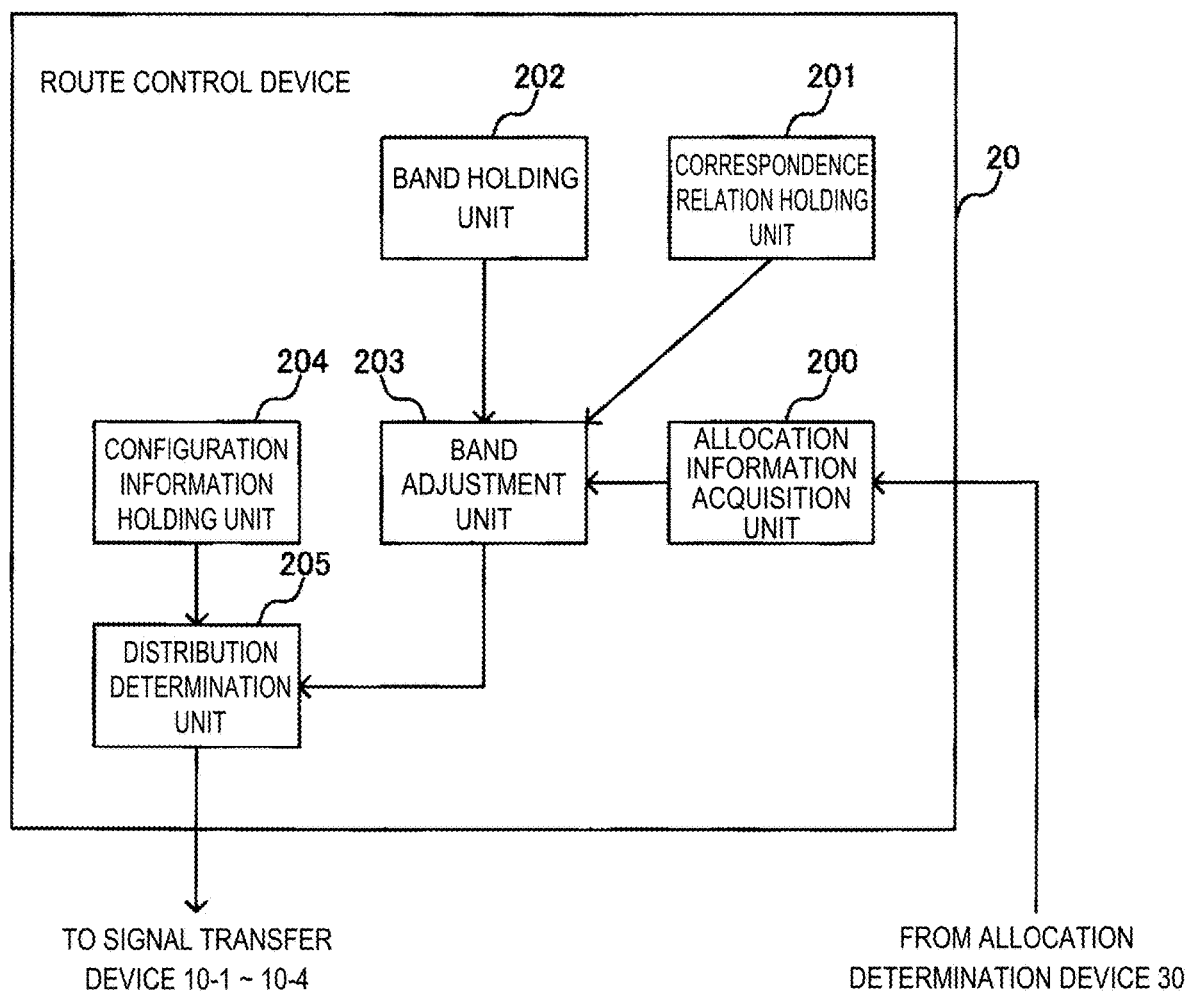
FIG. 2 is a diagram illustrating an exemplary configuration of a route control device according to one embodiment.

FIG. 2 is a diagram illustrating an exemplary configuration of the route control device 20 according to one embodiment. As illustrated in FIG. 2, the route control device 20 includes an allocation information acquisition unit 200, a correspondence relation holding unit 201, a band holding unit 202, a band adjustment unit 203, a configuration information holding unit 204, and a distribution determination unit 205.

The allocation information acquisition unit 200 acquires frequency allocation information to each base station output from the allocation determination device 30, and outputs the acquired allocation information to the band adjustment unit 203.

The correspondence relation holding unit 201 holds correspondence relation information indicating which UNI is for a signal of which service provider, that is, a correspondence relation between a UNI and a service provider (user), and outputs the correspondence relation information to the band adjustment unit 203.

The band holding unit 202 holds band information representing the maximum MBH band for each UNI, and outputs the band information to the band adjustment unit 203.

FIG. 3 illustrates a specific example of band information held by the band holding unit 202. The band holding unit 202 holds a band maximum value of the MBH band of each of six UNIs namely a first UNI to a sixth UNI for example. Note that the values included in the band information will be described in detail with use of FIG. 4.

The band adjustment unit 203 (FIG. 2) uses the correspondence relation information and the band information described above to adjust the MBH band for each UNI on the basis of the allocation information acquired by the allocation information acquisition unit 200, and outputs the adjusted MBH band to the distribution determination unit 205.

The configuration information holding unit 204 holds configuration information representing the connection configuration of the signal transfer devices 10-1 to 10-4, and outputs the configuration information to the distribution determination unit 205.

The distribution determination unit 205 determines signal distribution to the NNI of each of the signal transfer devices 10-1 to 10-4, on the basis of the adjusted MBH band for each UNI and the configuration information input from the band adjustment unit 203 and the configuration information holding unit 204.

Next, an exemplary operation of the route control device 20 will be described.

FIG. 4 illustrates an exemplary operation of the route control device 20 using band information. FIG. 4(*a*) illustrates signal distribution from UNIs to NNIs in the case where band adjustment is not performed. FIG. 4(*b*) illustrates signal distribution from UNIs to NNIs in the case where the route control device 20 performs band adjustment. FIG. 4(*c*) illustrates signal distribution from UNIs to NNIs in the case where the route control device 20 performs band adjustment when allocation of frequency band is changed after the band adjustment illustrated in FIG. 4(*b*).

Since band adjustment is not performed in the example illustrated in FIG. 4(*a*), this is the same as conventional art, and signal distribution is determined on the basis of the maximum required band for each UNI. In this example, the required band for each of the first UNI to the sixth UNI is 10 Gbps. The transmission capacity of each of the first NNI to the sixth NNI is also 10 Gbps. Therefore, the NNIs are assigned to the first UNI to the sixth UNI respectively, that is, the first NNI to the sixth NNI (six NNIs in total) are used.

In the example illustrated in FIG. 4(*b*), the band adjustment unit 203 adjusts the MBH band for each UNI, on the basis of the correspondence relation information input from the correspondence relation holding unit 201 and the frequency allocation information input from the allocation information acquisition unit 200. The adjustment to be performed by the band adjustment unit 203 is executable even when $g_{ji}$ is any function. Here, it is assumed that $g_{ji}$ is a linear function in proportion to the frequency bandwidth.

As illustrated in FIG. 4(*b*), the first UNI and the second UNI of the service provider A to each of which a bandwidth B/4 is allocated are adjusted to be ¼ of the originally required band. The third UNI and the fourth UNI of the service provider to each of which a bandwidth B/4 is allocated are adjusted to be ¼ of the originally required band. The fifth UNI and the sixth UNI of the service provider C to each of which a bandwidth B/2 is allocated are adjusted to be ½ of the originally required band.

At that time, the route control device 20 assigns the first UNI to the fourth UNI to the first NNI, and assigns the fifth UNI and the sixth UNI to the second NNI, to thereby enable signals to be transferred by two NNIs in total. This means that the signal transfer system 100 can reduce the required number of NNIs compared with the conventional example requiring six NNIs.

In the example illustrated in FIG. 4(*c*), when there is a change in the allocation of the frequency band, the band adjustment unit 203 readjusts the MBH band for each UNI, on the basis of the frequency allocation information acquired by the allocation information acquisition unit 200.

As illustrated in FIG. 4(*c*), when there is a change in the allocation of the frequency band, the first UNI and the second UNI of the service provider A to each of which a bandwidth B/2 is allocated are adjusted to be ½ of the originally required band. The third UNI and the fourth UNI of the service provider B to each of which a bandwidth B/3 is allocated are adjusted to be ⅓ of the originally required band. The fifth UNI and the sixth UNI of the service provider C to each of which a bandwidth B/6 is allocated are adjusted to be ⅙ of the originally required band.

That is, in the signal distribution state illustrated in FIG. 4(*b*), when there is a change in the frequency band, the sum of the required bands of the first UNI to the fourth UNI is 16.6 Gbps, whereby signal transfer cannot be handled by one NNI. Therefore, the route control device 20 assigns the first UNI and the second UNI to the first NNI, and assigns the third UNI to the sixth UNI to the second NNI, to thereby realize 10 Gbps per NNI. Then, each time signal distribution is performed, the route control device 20 outputs a signal distribution instruction to the signal transfer device 10 that is a target of signal distribution change.

Next, a first modification of the signal transfer system 100 will be described.

FIG. 5 illustrates an exemplary operation of the first modification (signal transfer system 100*a*) of the signal transfer system 100. FIG. 5(*a*) illustrates exemplary routes for transferring signals in the signal transfer system 100*a*. FIG. 5(*b*) illustrates an exemplary operation of a signal transfer device 10*a*-3.

In the signal transfer system 100*a*, base stations A, B, and C of the respective service providers A, B, and C belong to signal transfer devices 10*a*-2 to 10*a*-4 one to one. Here, it is assumed that a required band of the service provider A is 3 Gbps, a required band of the service provider B is 2 Gbps, and a required band of the service provider C is 1 Gbps.

Further, in the signal transfer system 100*a*, the signal transfer devices 10*a*-1 to 10*a*-4 are connected by a ring-type network, and a signal is transmitted through the following route: the signal transfer device 10*a*-4→the signal transfer device 10*a*-3→the signal transfer device 10*a*-2→the signal transfer device 10*a*-1.

While FIG. 5(*a*) does not illustrate the route control device 20, the allocation determination device 30, and the aggregation stations A, B, and C, it is assumed that similar functions are provided to the signal transfer system 100*a*. It is also assumed that every $g_{ji}(xa)$ is the same linear function for the sake of simplicity. Moreover, in this example, $g_{ji}(B)=6$ Gbps, $0 \leq i \leq n$, $0 \leq j \leq t$ is set as preconditions. That is, the signal transfer system 100*a* is assumed to be $g_{j1}(x_{j1})+g_{j2}(x_{j2})+g_{j3}(x_{j3})=6$ Gbps.

Moreover, as illustrated in FIG. 5(*b*), the signal transfer device 10*a*-3 includes the first UNI to the third UNI 40-1 to 40-3, the first NNI to the third NNI 42-1 to 42-3, and a signal distribution unit 44. The first NNI to the third NNI 42-1 to 42-3 each have 10 Gpbs at maximum. The signal distribution unit 44 arbitrarily distributes signals received by the first UNI to the third UNI 40-1 to 40-3, to the first NNI to the third NNI 42-1 to 42-3. It is assumed that the signal transfer devices 10*a*-1 to 10*a*-4 have substantially the same configuration.

First, in the signal transfer system 100*a*, the signal transfer device 10*a*-4 puts signals of the base stations A, B, and C into one by the signal distribution unit 44, whereby a signal (signal #a) of 6 Gbps in total is output from one NNI to the signal transfer device 10*a*-3. The signal #a is represented by Expression (1) provided below.

[Math. 1]

$$\Sigma g_{4i}(x_{4i})=6 \text{ Gbps} \tag{1}$$

As shown in FIG. 5(*b*) as well, the signal transfer device 10*a*-3 multiplexes, by the signal distribution unit 44, the signal #a input from the first NNI 42-3 and a signal of 3 Gbps of the base station A under its control, and outputs it as a signal (signal #b) of 9 Gbps from the second NNI 42-2 to the signal transfer device 10*a*-2. The signal #b is represented by Expression (2) provided below.

[Math. 2]

$$\Sigma g_{4i}(x_{4i})+g_{31}(x_{31})=9 \text{ Gbps} \tag{2}$$

Further, the signal transfer device 10*a*-3 multiplexes signals of the base stations B and C under its control, and outputs it as a signal (signal #c) of 3 Gbps from the first NNI 42-1 to the signal transfer device 10*a*-2. The signal #c is represented by Expression (3) provided below.

[Math. 3]

$$g_{32}(x_{32})+g_{33}(x_{33})=3 \text{ Gbps} \tag{3}$$

Then, the signal transfer device 10*a*-2 multiplexes the signal #c input from the signal transfer device 10*a*-3 and signals of 6 Gbps of the base stations A, B, and C under its control, and outputs it as a signal (signal #d) of 9 Gbps from one NNI to the signal transfer device 10*a*-1. The signal #d is represented by Expression (4) provided below.

[Math. 4]

$$g_{32}(x_{32})+g_{33}(x_{33})+\Sigma g_{2i}(x_{2i})=9 \text{ Gbps} \tag{4}$$

Next, the signal transfer device 10*a*-2 does not newly multiplex the signal #b input from the signal transfer device 10*a*-3, and outputs as a signal of 9 Gbps different from the signal #d from one NNI to the signal transfer device 10*a*-1.

That is, the number of required NNIs in the signal transfer device 10*a*-1 is two, which receives only the signal #b and the signal #b each having 10 Gbps or less.

Figure 9:
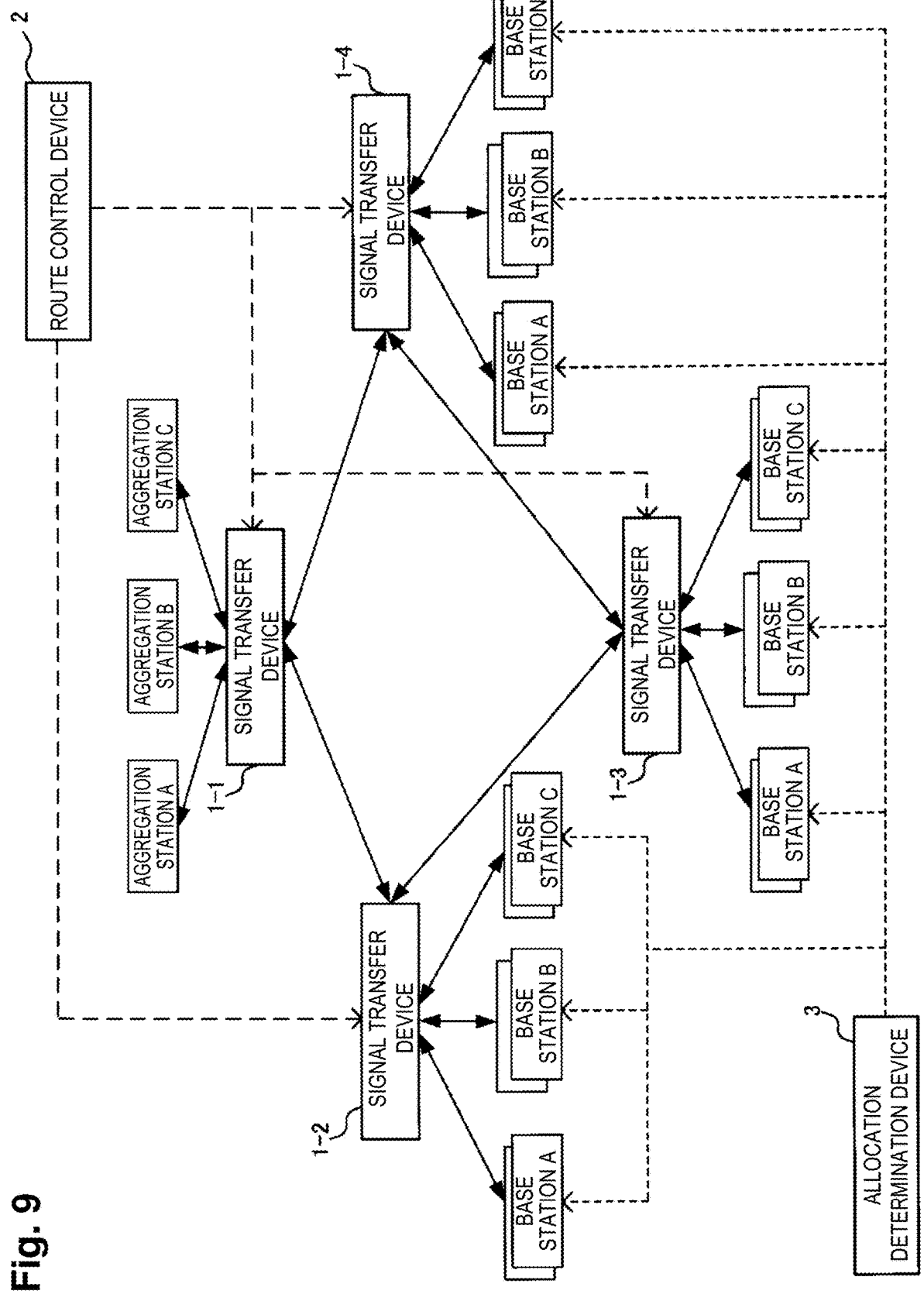
FIG. 9 is a diagram illustrating an exemplary configuration of a signal transfer system in which a plurality of signal transfer devices each accommodate base stations of a plurality of service providers at different locations.
Figure 10:
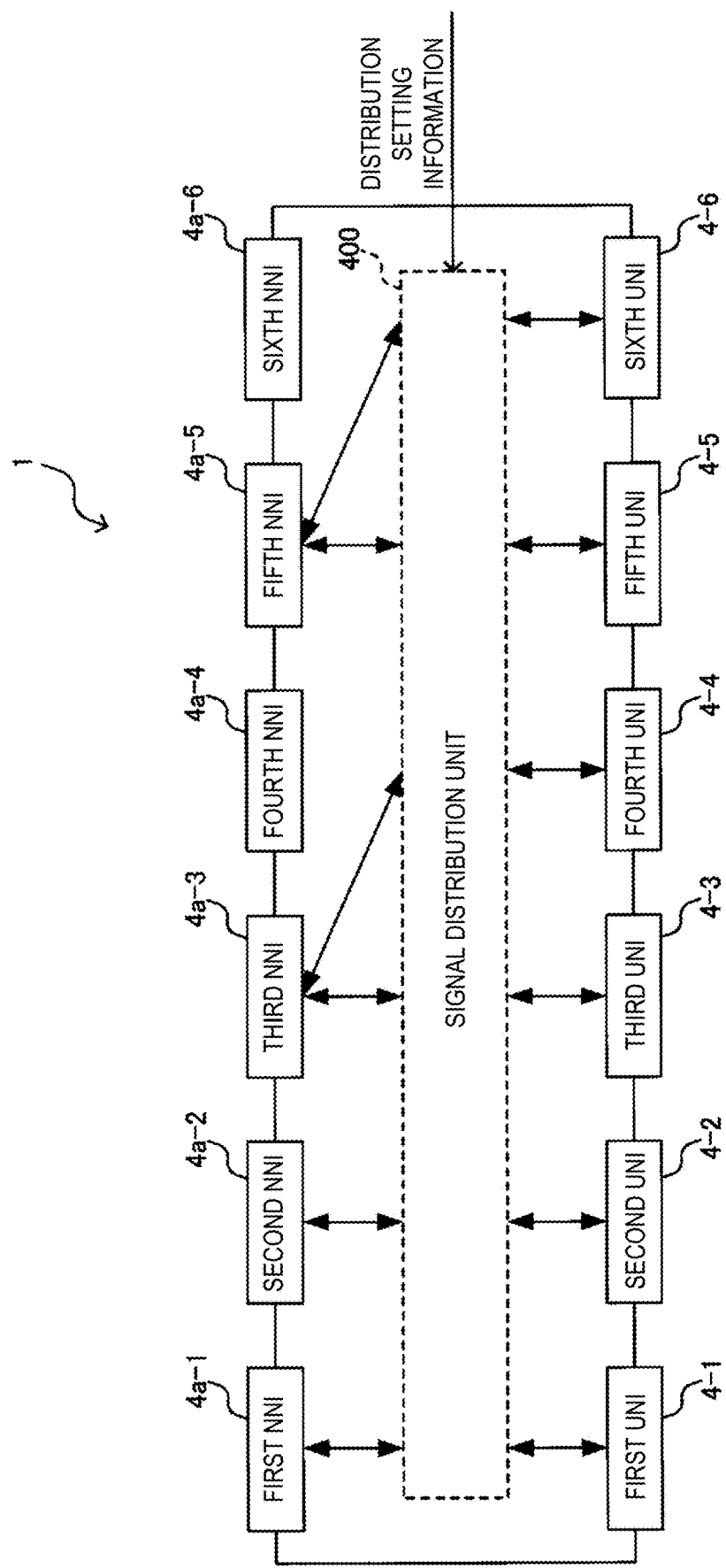
FIG. 10 illustrates an exemplary configuration of a signal transfer device.
Figure 11:
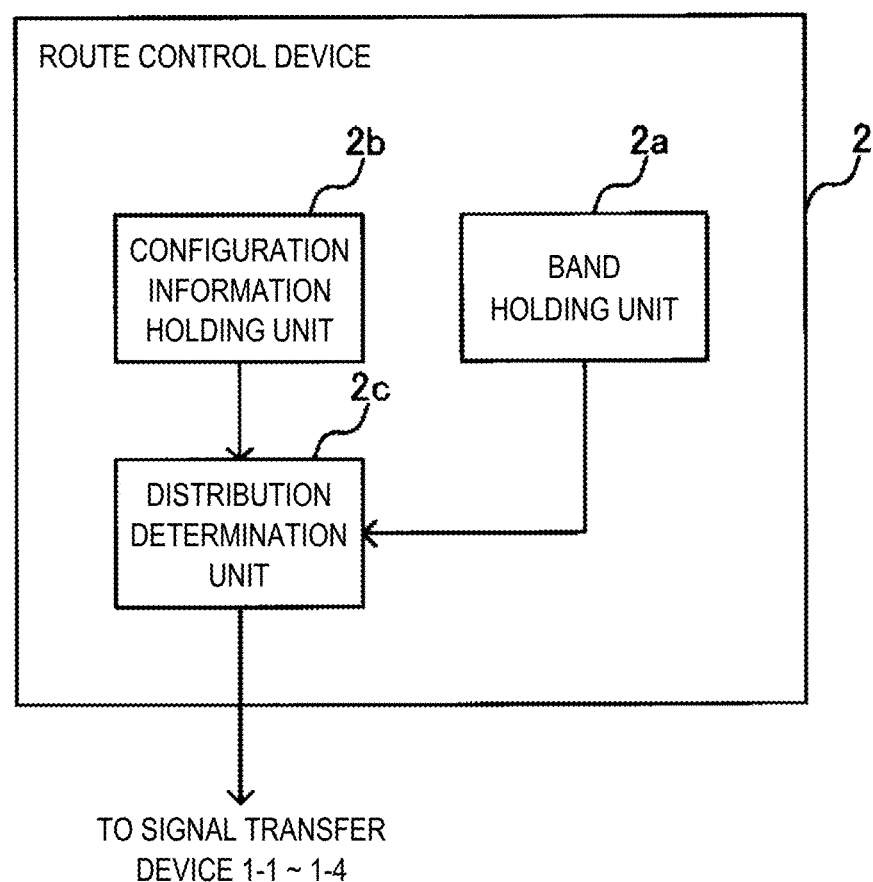
FIG. 11 illustrates an exemplary configuration of a route control device.

On the other hand, in the case where the conventional signal transfer device (see FIG. 9: signal transfer device 1) is used instead of the signal transfer devices 10*a*-1 to 10*a*-4 in the signal transfer system 100*a*, signal multiplexing by the signal distribution unit (see FIG. 10: signal distribution unit 400) cannot be performed. In that case, three signal transfer devices transfer signals using three NNIs respectively, so that nine NNIs in total are required eventually.

As described above, in the signal transfer system 100*a*, the number of NNIs can be reduced to two, although nine NNIs have been required in the conventional art.

FIG. 6 illustrates an exemplary operation of the signal transfer system 100*a* when allocation of the frequency band is changed after the band adjustment illustrated in FIG. 5. FIG. 6(*a*) illustrates an exemplary route of transferring a signal in the signal transfer system 100*a*. FIG. 6(*b*) illustrates an exemplary operation of the signal transfer device 10*a*-3. Here, it is assumed that the required band of the service provider A is changed to 1 Gbps, the required band of the service provider B is changed to 1 Gbps, and the required band of the service provider C is changed to 4 Gbps.

Here, in the signal transfer system 100*a*, the signal transfer device 10*a*-4 puts signals of the base stations A, B, and C into one by the signal distribution unit 44, whereby a signal (signal #a) of 6 Gbps in total is output from one NNI to the signal transfer device 10*a*-3. The signal #a is represented by Expression (5) provided below.

[Math. 5]

$$\Sigma g_{4i}(x_{4i})=6 \text{ Gbps} \tag{5}$$

As shown in FIG. 6(*b*) as well, the signal transfer device 10*a*-3 multiplexes, by the signal distribution unit 44, the signal #a input from the third NNI 42-3 and a signal of 4

Gbps of the base station C under its control, and outputs it as a signal (signal #b) of 10 Gbps from the second NNI 42-2 to the signal transfer device 10*a*-2. The signal #b is represented by Expression (6) provided below.

[Math. 6]

$$\Sigma g_{4i}(x_{4i}) + g_{33}(x_{33}) = 10 \text{ Gbps} \qquad (6)$$

Further, the signal transfer device 10*a*-3 multiplexes signals of the base stations A and B under its control, and outputs it as a signal (signal #c) of 2 Gbps from the first NNI 42-1 to the signal transfer device 10*a*-2. The signal #c is represented by Expression (7) provided below.

[Math. 7]

$$g_{31}(x_{31}) + g_{32}(x_{32}) = 2 \text{ Gbps} \qquad (7)$$

Next, the signal transfer device 10*a*-2 multiplexes the signal #c input from the signal transfer device 10*a*-3 and signals of 6 Gbps of the base stations A, B, and C under its control, and outputs it as a signal (signal #d) of 8 Gbps from one NNI to the signal transfer device 10*a*-1. The signal #d is represented by Expression (8) provided below.

[Math. 8]

$$g_{31}(x_{31}) + g_{32}(x_{32}) + \Sigma g_{2i}(x_{2i}) = 8 \text{ Gbps} \qquad (8)$$

Next, the signal transfer device 10*a*-2 does not newly multiplex the signal #b input from the signal transfer device 10*a*-3, and outputs as a signal of 10 Gbps different from the signal #d from one NNI to the signal transfer device 10*a*-1.

That is, in the signal transfer system 100*a*, the signal transfer device 10*a*-3 changes the signal distribution. Therefore, the number of required NNIs in the signal transfer device 10*a*-1 is two for receiving only the signal #b and the signal #d of 10 Gbps or less, like the case before the change of the frequency allocation.

Note that if the signal distribution unit 44 does not change the signal distribution illustrated in FIG. 5(*b*) even though allocation of the frequency band has been changed, the signal transfer device 10*a*-3 will output a signal of 7 Gbps obtained by multiplexing the signal (signal #a) of 6 Gbps and the signal of the base station A under its control, and a signal of 5 Gbps obtained by multiplexing the signals of the base stations B and C under its control, to the signal transfer device 10*a*-2.

In that case, even if the signal transfer device 10*a*-2 multiplexes the signal of 6 Gbps obtained by multiplexing the signals of the base stations A, B, and C under its control and either a signal of 7 Gbps or a signal of 5 Gbps, the resultant exceeds the maximum value (10 Gbps) of the band of the NNI. This may result in packet discarding.

Therefore, the route control device 20 is adapted to acquire frequency allocation information output from the allocation determination device 30, and when allocation of the frequency band to the base stations A, B, and C is changed, determine signal distribution again by the distribution determination unit 205, and output a distribution change instruction to the signal transfer device 10 (signal transfer device 10*a*) that is the target of signal distribution change.

Next, a second modification of the signal transfer system 100 will be described.

Figure 7:
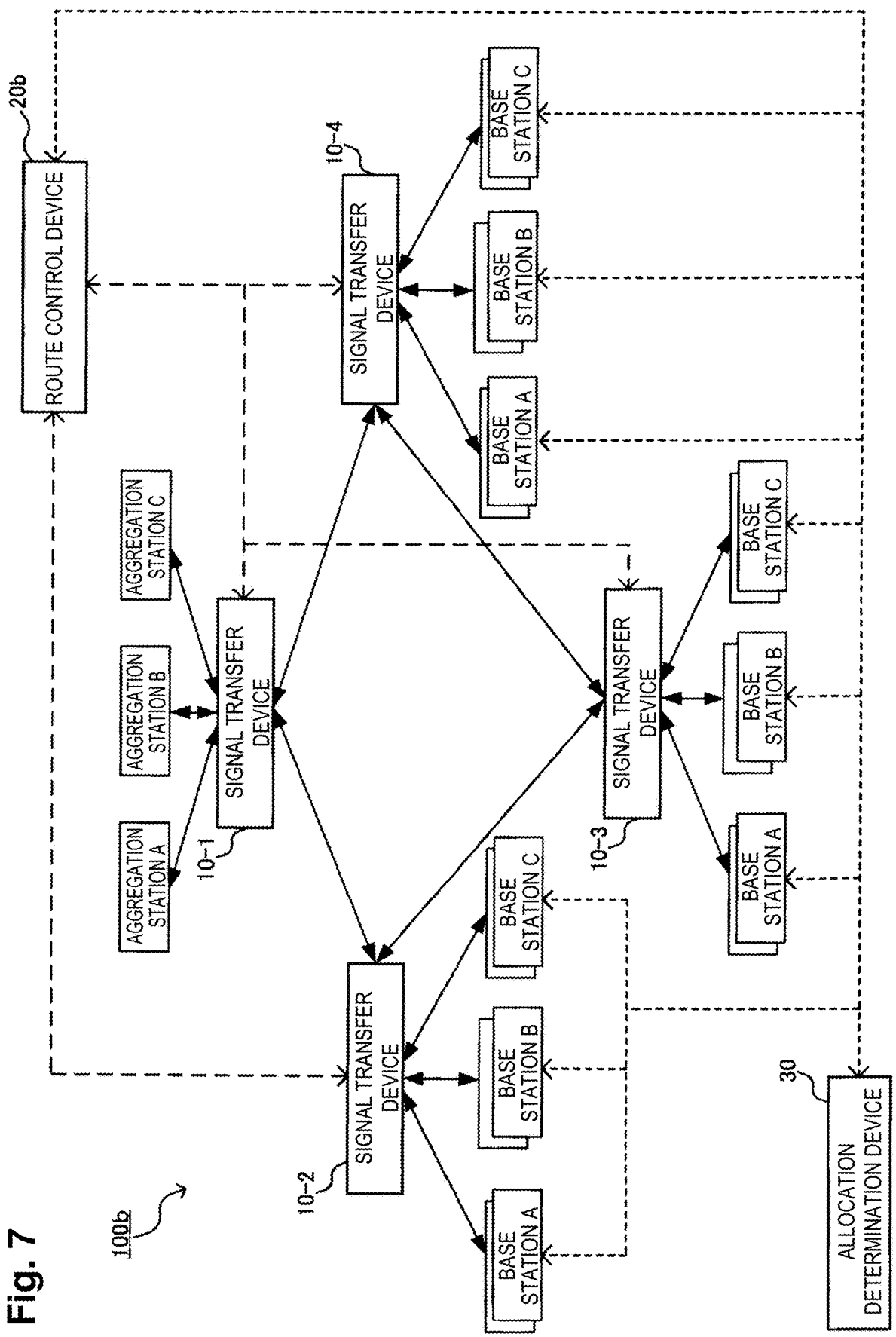
FIG. 7 is a diagram illustrating an exemplary configuration of a second modification of a signal transfer system according to one embodiment.

FIG. 7 illustrates an exemplary configuration of the second modification (signal transfer system 100*b*) of the signal transfer system 100. As illustrated in FIG. 7, the signal transfer system 100*b* includes, for example, four signal transfer devices 10-1 to 10-4, a route control device 20*b*, and an allocation determination device 30, and constitutes a cellular system in which radio terminals perform radio communication via base stations accommodated in, for example, each of the signal transfer devices 10-2 to 10-4.

The signal transfer system 100*b* differs from the signal transfer system 100 illustrated in FIG. 1 in that the route control device 20*b* collects traffic information from the signal transfer devices 10-1 to 10-4, and the route control device 20*b* outputs a frequency allocation change request to the allocation determination device 30. Note that in the signal transfer system 100*b*, substantially the same configurations as the configurations of the signal transfer system 100 illustrated in FIG. 1 are denoted by the same reference numerals.

Figure 8:
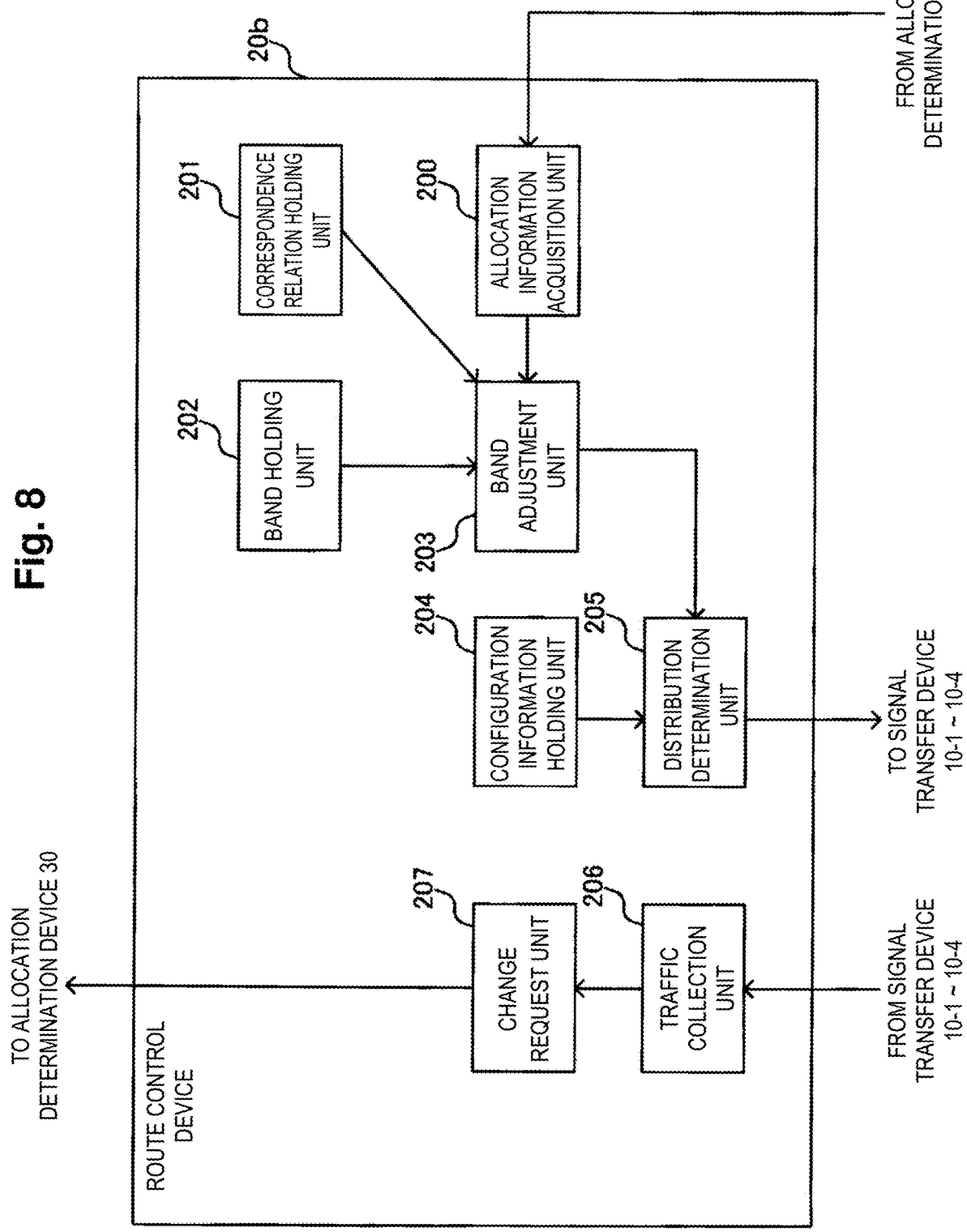
FIG. 8 is a diagram illustrating an exemplary configuration of a route control device according to one embodiment.

FIG. 8 illustrates an exemplary configuration of the route control device 20*b*. As illustrated in FIG. 8, the route control device 20*b* includes an allocation information acquisition unit 200, a correspondence relation holding unit 201, a band holding unit 202, a band adjustment unit 203, a configuration information holding unit 204, a distribution determination unit 205, a traffic collection unit 206, and a change request unit 207.

The traffic collection unit 206 is a traffic monitor that collects traffic information representing traffic from the signal transfer devices 10-1 to 10-4 to the base stations A, B, and C (service providers A, B, and C) respectively, and outputs it to the change request unit 207. Here, it is assumed that the traffic information includes the buffer amount and the like. Further, the cycle that the traffic collection unit 206 collects the traffic information can be set arbitrarily.

The change request unit 207 outputs, to the allocation determination device 30, allocation change request information representing a frequency change request to each of the base stations A, B, and C (service providers A, B, and C), on the basis of the traffic information input from the traffic collection unit 206.

For example, when the number of times or the period of time that an average value or a maximum value of the MBH traffic amount of a service provider exceeds the value obtained by multiplying the maximum required band currently expected by a coefficient becomes a threshold or larger, the change request unit 207 outputs allocation change request information to the allocation determination device 30 so as to increase the allocation of the frequency bandwidth of the service provider. At that time, the change request unit 207 outputs allocation change request information to the allocation determination device 30 so as to reduce allocation of the frequency bandwidth of the other service providers or a service provider whose average value or maximum value of the MBH traffic amount is small.

Note that the traffic collection unit 206 and the change request unit 207 are not limited to be mounted on the route control device 20*b*, and may be mounted on another device.

As described above, the signal transfer system according to the present embodiment adjusts signal distribution between the UNIs and the NNIs in the signal transfer devices on the basis of frequency allocation information output from the allocation determination device. Therefore, the signal transfer system can transfer signals from a plurality of base stations efficiently.

Note that the functions of the allocation determination device 30 may be implemented in the route control device 20 for example. Moreover, while the signal transfer system according to the embodiment described above has been described with an example having three service providers, the number of service providers is not limited thereto.

Furthermore, the signal transfer system according to the embodiment is not limited to the case where a plurality of service providers develop services at the same time and the same place using different frequency bands. The embodiment is also applicable to the case where a plurality of service providers develop services at the same time and the same place using the same frequency band.

Furthermore, while the signal transfer system according to the embodiment has been described with an example in which $g_{jk}(x_{ji})$ is a monotone increasing function and the required MBH band is larger as the frequency bandwidth is larger, $g_{jk}(x_{ji})$ may be any function.

Note that the respective functions held by the signal transfer systems 100, 100a, and 100b according to the present invention may be implemented by dedicated hardware, or may be implemented as programs on general-purpose hardware having a function as a computer provided with a CPU. That is, the signal transfer systems 100, 100a, and 100b can be realized by a computer and a program, and the program can be recorded on a recording medium or provided over a network.

The embodiments described above show embodiments of the present invention in an illustrative manner and not a limitative manner. The present invention can be carried out in other various modified and changed manners.

REFERENCE SIGNS LIST 100, 100a, 100b Signal transfer system
10-1~10-4, 10a-1~10a-4 Signal transfer device
20, 20b Route control device
30 Allocation determination device
40-1~40-3 First UNI-third UNI
42-1~42-3 First NNI-third NNI
200 Allocation information acquisition unit
201 Correspondence relation holding unit
202 Band holding unit
203 Band adjustment unit
204 Configuration information holding unit
205 Distribution determination unit
206 Traffic collection unit
207 Change request unit

The invention claimed is:

1. A signal transfer system comprising:
a plurality of signal transfer devices that relay a plurality of base stations of a plurality of service providers that perform communication with radio terminals and an aggregation station that controls the plurality of the base stations; and
a route control device that controls signal distribution to a plurality of user network interfaces (UNIs) and a plurality of network network interfaces (NNIs) of each of the plurality of the signal transfer devices,
wherein the route control device includes:
a processor; and
a storage medium having computer program instructions stored thereon, when executed by the processor, perform to:
acquires allocation information of frequency to each of the base stations;
adjusts an MBH band for each of the plurality of the UNIs, on a basis of correspondence relation information representing a correspondence relation between the UNIs and the plurality of the service providers, band information indicating a maximum MBH band of each of the UNIs, and the allocation information; and
determines signal distribution to each of the plurality of the NNIs, on a basis of the adjusted MBH band and configuration information representing a connection configuration of each of the signal transfer devices,
wherein each of the signal transfer devices transmits a signal from each of the NNIs on a basis of the signal distribution to each of the determined NNIs.

2. The signal transfer system according to claim 1, wherein the computer program instructions further perform to collects traffic information representing traffic of each of the plurality of the base stations; and outputs allocation change request information representing an allocation change request of frequency to each of the base stations, on a basis of the traffic information, wherein the allocation information changed on a basis of the allocation change request information.

3. A signal transfer method using a plurality of UNIs and a plurality of NNIs of each of a plurality of signal transfer devices that relay a plurality of base stations of a plurality of service providers that perform communication with radio terminals and an aggregation station that controls the plurality of the base stations, the method comprising:
an allocation information acquisition step of acquiring allocation information of frequency to each of the base stations;
a band adjustment step of adjusting an MBH band for each of the plurality of the UNIs, on a basis of correspondence relation information representing a correspondence relation between the UNIs and the plurality of the service providers, band information representing a maximum MBH band of each of the UNIs, and the allocation information; and
a distribution determination step of determining signal distribution to each of the NNIs, on a basis of the adjusted MBH band and configuration information representing a connection configuration of each of the signal transfer devices.

4. The signal transfer method according to claim 3, further comprising: a traffic collection step of collecting traffic information representing traffic of each of the plurality of the base stations; and a change request step of outputting allocation change request information representing an allocation change request of frequency to each of the plurality of the base stations, on a basis of the traffic information, wherein the allocation information acquisition step includes acquiring the allocation information changed on a basis of the allocation change request information.

5. A route control device that controls signal distribution to a plurality of UNIs and a plurality of NNIs of each of a plurality of signal transfer devices that relay a plurality of base stations of a plurality of service providers that perform communication with radio terminals and an aggregation station that controls the plurality of the base stations, the device comprising:
a processor;
and a storage medium having computer program instructions stored thereon, when executed by the processor, perform to:
acquires allocation information of frequency to each of the plurality of the base stations;
adjusts an MBH band for each of the plurality of the UNIs, on a basis of correspondence relation information representing a correspondence relation between the UNIs and the plurality of the service providers, band information indicating a maximum MBH band of each of the UNIs, and the allocation information; and determines signal distribution to each of the plurality of the NNIs, on a basis of the adjusted MBH band and configuration information representing a connection configuration of each of the plurality of the signal transfer devices.

6. The route control device according to claim 5, wherein the computer program instructions further perform to collects traffic information representing traffic of each of the plurality of the base stations; and outputs allocation change request information representing an allocation change request of frequency to each of the plurality of the base stations, on a basis of the traffic information, wherein acquires the allocation information changed on a basis of the allocation change request information.

* * * * *